UNITED STATES PATENT OFFICE.

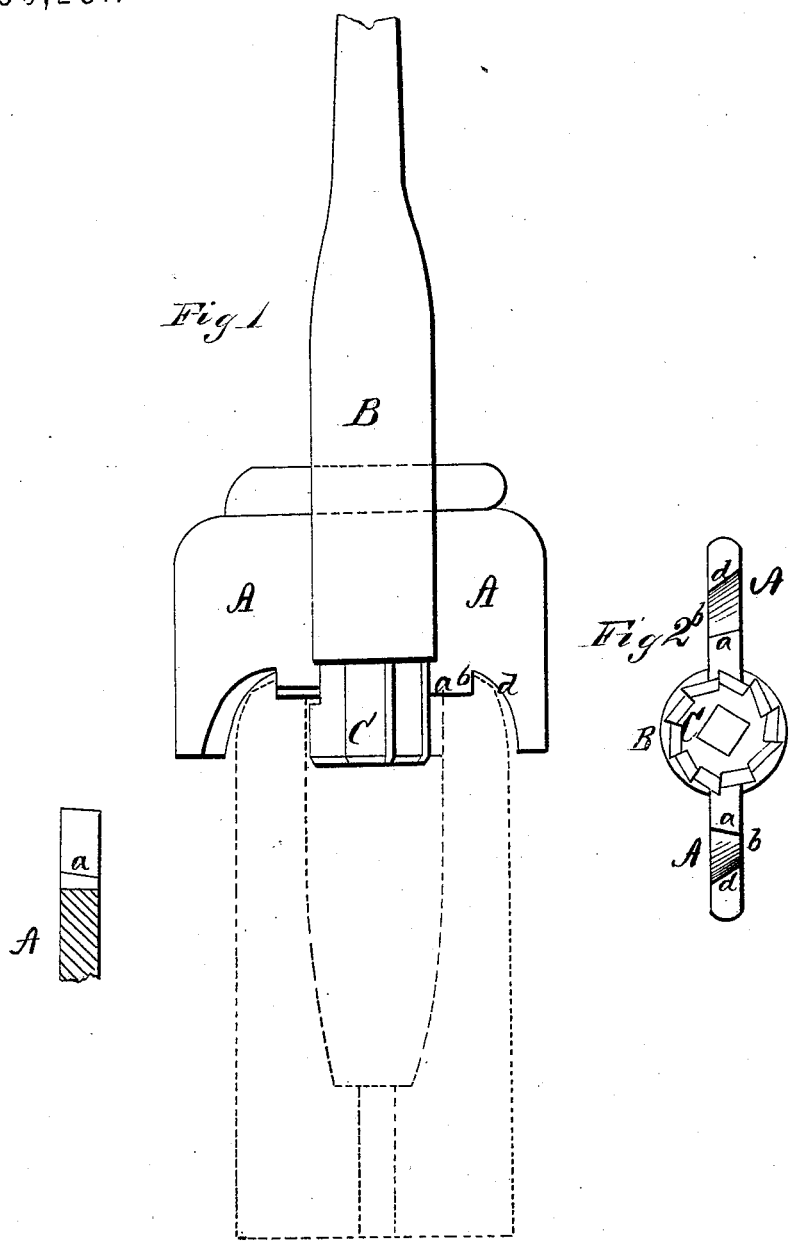

ALEXANDER BRENGLE, OF FREDERICK, MARYLAND.

IMPROVEMENT IN TOOLS FOR DRESSING SOLDERING-IRONS.

Specification forming part of Letters Patent No. 150,281, dated April 28, 1874; application filed March 26, 1874.

*To all whom it may concern:*

Be it known that I, ALEXANDER BRENGLE, of Frederick, in the county of Frederick and in the State of Maryland, have invented certain new and useful Improvements in Tools for Dressing Soldering or Capping Irons; and do hereby declare that the following is a full, clear, and exact description thereof, reference being had to the accompanying drawings and to the letters of reference marked thereon, making a part of this specification.

The nature of my invention consists in the construction of a tool or cutter for dressing circular-faced soldering or capping irons, as will be hereinafter more fully set forth.

In order to enable others skilled in the art to which my invention appertains to make and use the same, I will now proceed to describe its construction and operation, referring to the annexed drawing, in which—

Figure 1 is a side view of my cutting-tool, and Fig. 2 is an end view of the same.

The soldering or capping irons generally used for soldering cans are cylindrical in form, with a central hole from the upper end downward for a suitable distance, and on the upper face is a circular shoulder or offset. My cutter or tool is intended to cut this face, and also to dress it when it is corroded or otherwise incrustated by the action of the acid used in soldering cans.

To this end I construct one or more cutters, A, each having three cutting-edges, $a$, $b$, and $d$, the inner edge, $a$, being horizontal, to correspond with the horizontal part of the shoulder on the soldering-iron. The cutting-edge $b$ is vertical, and corresponds with the vertical part at the shoulder of the soldering-iron. The cutting-edge $d$ is curved, and corresponds with the curved edge of the soldering-iron. One or more of these cutters A are attached in or formed on a central shaft or stem, B, the lower end of which forms a reamer, C, to cut out and dress the central hole in the soldering-iron.

By the use of a tool or cutter of this description, the soldering or capping iron may be made in the first place, the shaft or stem of the cutter being held in an ordinary drilling-machine; and the soldering-iron is also dressed by said tool after it has become corroded or incrustated by the action of the acid used in soldering cans.

Having thus fully described my invention, what I claim as new, and desire to secure by Letters Patent, is—

1. One or more cutters, A, provided with the three cutting-edges $a$, $b$, and $d$, and attached to, or formed on, a shaft, B, for the purposes herein set forth.

2. One or more cutters, A, provided with the three cutting-edges $a$, $b$, and $d$, as described, in combination with the reamer C, all attached to or formed on the shaft B, substantially as and for the purposes herein set forth.

In testimony that I claim the foregoing I have hereunto set my hand this 20th day of March, 1874.

ALEXANDER BRENGLE.

Witnesses:
R. STOKES,
GIDEON BANTZ.